United States Patent
Albal et al.

(10) Patent No.: US 7,054,302 B2
(45) Date of Patent: May 30, 2006

(54) METHOD AND APPARATUS FOR INTERWORKING DISPATCH SERVICES NETWORK

(75) Inventors: Nandakishore A. Albal, Scottsdale, AZ (US); Peter J. Armbruster, Chandler, AZ (US); Thomas G. Hallin, Wheaton, IL (US); Bradley R. Schaefer, Chandler, AZ (US); Mark L. Shaughnessy, Phoenix, AZ (US); Steven D. Upp, Bartlett, IL (US); William R. Worger, Gilbert, AZ (US); George Xenakis, Tempe, AZ (US)

(73) Assignee: Motorola, Inc., Schaumburg, IL (US)

( * ) Notice: Subject to any disclaimer, the term of this patent is extended or adjusted under 35 U.S.C. 154(b) by 106 days.

(21) Appl. No.: 10/400,132

(22) Filed: Mar. 25, 2003

(65) Prior Publication Data

US 2004/0190535 A1    Sep. 30, 2004

(51) Int. Cl.
*H04L 12/66* (2006.01)
(52) U.S. Cl. .............................. 370/347; 370/401
(58) Field of Classification Search .................. 455/507, 455/517, 518, 519; 370/400, 401, 310, 345, 370/347, 442, 466
See application file for complete search history.

(56) References Cited

U.S. PATENT DOCUMENTS

| | | | |
|---|---|---|---|
| 5,850,611 A * | 12/1998 | Krebs | 455/518 |
| 5,878,045 A * | 3/1999 | Timbs | 370/466 |
| 5,987,331 A | 11/1999 | Grube et al. | |
| 6,163,697 A * | 12/2000 | Peterson et al. | 455/450 |
| 6,721,565 B1 * | 4/2004 | Ejzak et al. | 455/436 |
| 2002/0024943 A1 * | 2/2002 | Karaul et al. | 370/338 |
| 2005/0239485 A1 * | 10/2005 | Kundu et al. | 455/519 |

* cited by examiner

*Primary Examiner*—Derrick Ferris
(74) *Attorney, Agent, or Firm*—Frank J. Boqacz; Kevin D. Wills

(57) ABSTRACT

The voice signaling gateway (10) converts signaling and bearer traffic information between iDEN network (20) and various other networks (30–60). The voice signaling gateway includes a signaling portion (14) and a bearer traffic portion (12). The voice signaling gateway interfaces with any networks which support session initiation protocol (SIP). Further, the voice signaling gateway is capable of interworking with both 3G and 2G type networks.

10 Claims, 2 Drawing Sheets

METHOD AND APPARATUS FOR INTERWORKING DISPATCH SERVICES NETWORK

BACKGROUND OF THE INVENTION

The present invention pertains to supporting dispatch call services through iDEN networks and more particularly to providing these dispatch call services through a plurality of non-iDEN networks.

Today dispatch call services are provided by specialized networks such as iDEN (integrated digital enhanced network). A dispatch call is one in which the originator selects a person or persons to which he wishes to speak and the target user's phone immediately transmits the words of the originator, without the ringing and answering of typical phone calls.

The iDEN system is a "closed system" which offers dispatch services to those customers who are currently in the iDEN TDMA (time division multiple access) network. Other networks such as code-division multiple access (CDMA), global system mobile (GSM), internet protocol (IP) and 802.11 type networks do not support dispatch call services at the present time. Non-iDEN subscribers wish to make dispatch calls to the existing customer base of iDEN subscribers and vice-versa.

The users of dispatch call services are typically organized into talk groups. Talk groups usually contain users that share a common mission, such as a work group. Work groups may be put together such that not all the users are uniformly iDEN or non-iDEN. Current dispatch call service systems are unable to facilitate the connection of such diverse users.

Dispatch systems have been provided to alleviate this problem; however, such patches involve many limitations including missed calls, poor audio quality, and gaps in speech.

Accordingly, a need exists to provide for dispatch call services between iDEN users and non-iDEN systems.

DESCRIPTION OF THE PREFERRED EMBODIMENT OF THE INVENTION

Dispatch call services are becoming more widespread. Non-iDEN subscribers need to make dispatch calls to the existing customer base of millions of non-iDEN subscribers. Additionally, dispatch call service providers desire to provide new services such as desktop dispatch without changes to the basic iDEN network infrastructure.

In a broad sense the present invention includes the introduction of a new network element called a voice signaling gateway (VSGW). The VSGW provides signaling and bearer path conversion of all traffic between an iDEN network and non-iDEN networks. The VSGW is network agnostic on the non-iDEN network end. The VSGW may be used with Code Division Multiple Access (CDMA), General System Mobile (GSM), 802.11 (such as Wireless LANs) and traditional Internet Protocol (IP) for desktop dispatch call services. The present invention does not require the iDEN network elements to be modified, nor does the present invention require that the iDEN users be aware that they are communicating with users on a non-iDEN network.

Figure 1:
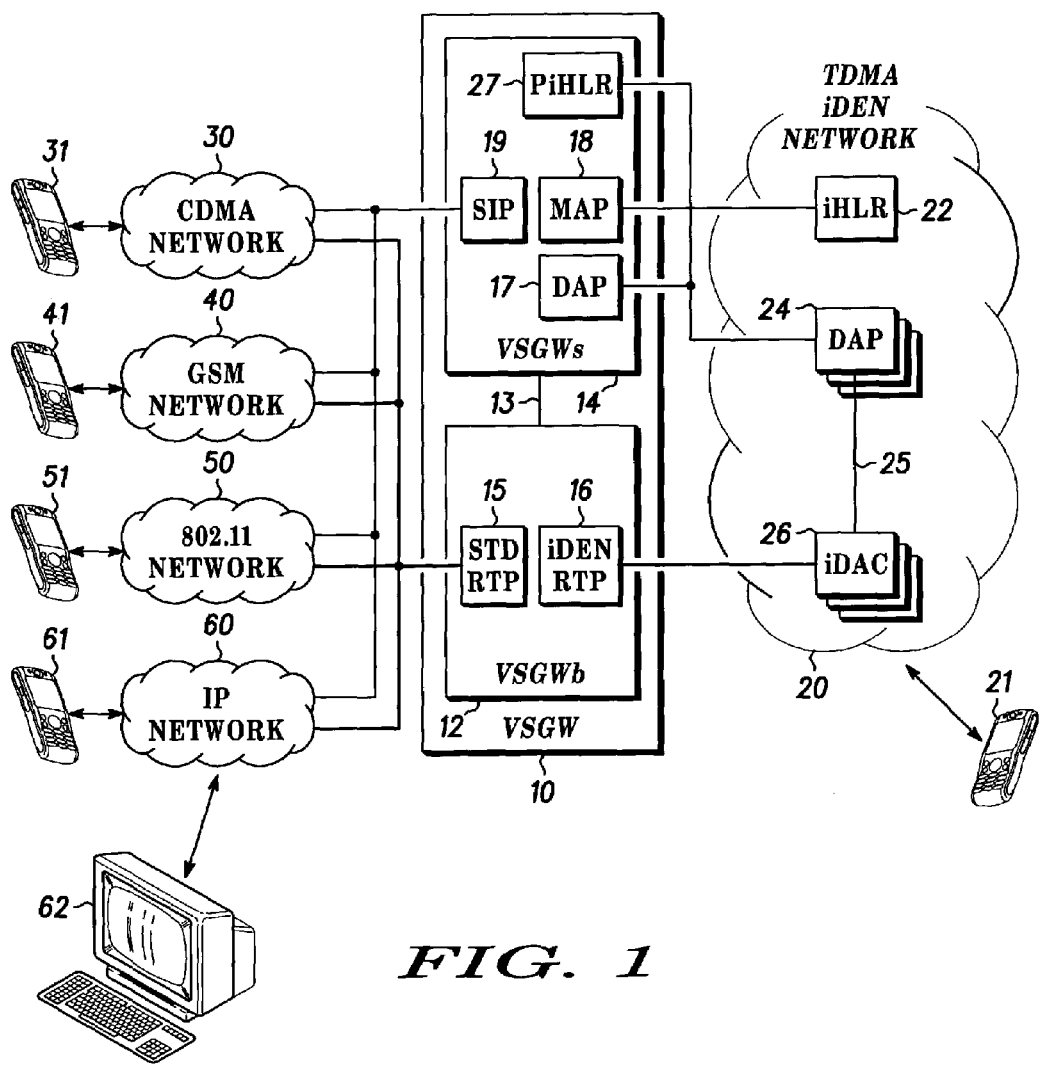
FIG. 1 is a block diagram of a system for facilitating dispatch calls among iDEN networks and various non-iDEN networks in accordance with the present invention.

Referring to FIG. 1, a block diagram of voice signaling gateway 10 interconnected between iDEN network 20 and a number of non-iDEN networks 30–60 is shown. The voice signaling gateway (VSGW) 10 provides dispatch call services including private call (i.e. PTT "walkie-talkie" like service) and call alert (i.e. PTT non-bearer audio "beep" indication to called party) which is interworking between legacy iDEN systems and non-iDEN systems such as session initiation protocol (SIP) based 3 G systems. SIP is a protocol that is used for setting up single or multi-party calls. SIP is defined by IETF RFC3261. The VSGW 10 communicates in the SIP protocol with other networks that support SIP.

The VSGW 10 allocates bearer resources for SIP to DAP dispatch calls. DAP is a dispatch application server that processes dispatch requests within the iDEN network 20. VSGW 10 looks like a DAP on the iDEN network 20 side and a SIP engine on the non-iDEN side. The iHLR 22 is the iDEN home location register. The iHLR is a database that includes subscriber records/profiles and rules that dictate how a dispatch call should be handled. The iHLR is the place where iDEN subscriber 21, for example, is registered and the network which provides service to subscriber 21. The iHLR 22 stores the subscriber profile and records and the identity of the DAP 24 that the subscriber is registered.

iDAC 26 is the iDEN dispatch audio controller. For the iDEN network 20, the iDAC 26 handles the voice payload. DAP 24 provides bearer traffic control to iDAC 26 via connection 25. VSGWb 12 of voice signaling gateway 10 behaves like iDAC 26. Standard RTP 15 and iDEN RTP 16 convert back and forth between the two real time protocols. iDEN RTP is used by the iDEN network 20 and standard RTP is used by the non-iDEN networks 30–60. RTP is defined in IETF RFC1889. The protocol conversion is performed by VSGWb 12.

DAP 24 is coupled to DAP 17 of VSGWs. DAP-DAP signaling is a proprietary signaling protocol used between DAP 24 and DAP 17. DAP 24 is the call engine that processes dispatch requests for iDEN network 20.

iHLR 22 of network 20 is coupled to DAP 17 of VSGWs 14. MAP is an abbreviation for mobile application part and is a standard based protocol which enables real time communication between nodes in a mobile cellular network. A typical use of the MAP signaling protocol is the transfer of location information from a visiting location register (VLR) which is within the DAP to the iDEN home location register (iHLR) 22. MAP includes a layer in the signaling system seven standards which is used by GSM networks and UMTS (Universal Mobile Telecommunications System). The standard is defined by ETSI TS129120V3.0.0. SIP 19 of VSGWS 14 provides SIP signaling on the SIP signaling lead. SIP signaling is a protocol that is used for setting up single or multi-party calls.

The SIP signaling lead couples SIP 19 to CDMA (code division multiple access) network 30, GSM (global system mobile) network 40, 802.11 (such as Wireless LAN) network 50 and internet protocol (IP) network 60.

Further, the VSGW 10 includes PiHLR 27. iHLR stores user profile information for 2G dispatch users. PiHLR 27 is a pseudo-iHLR used to store location information for 3 G dispatch users.

Figure 2:
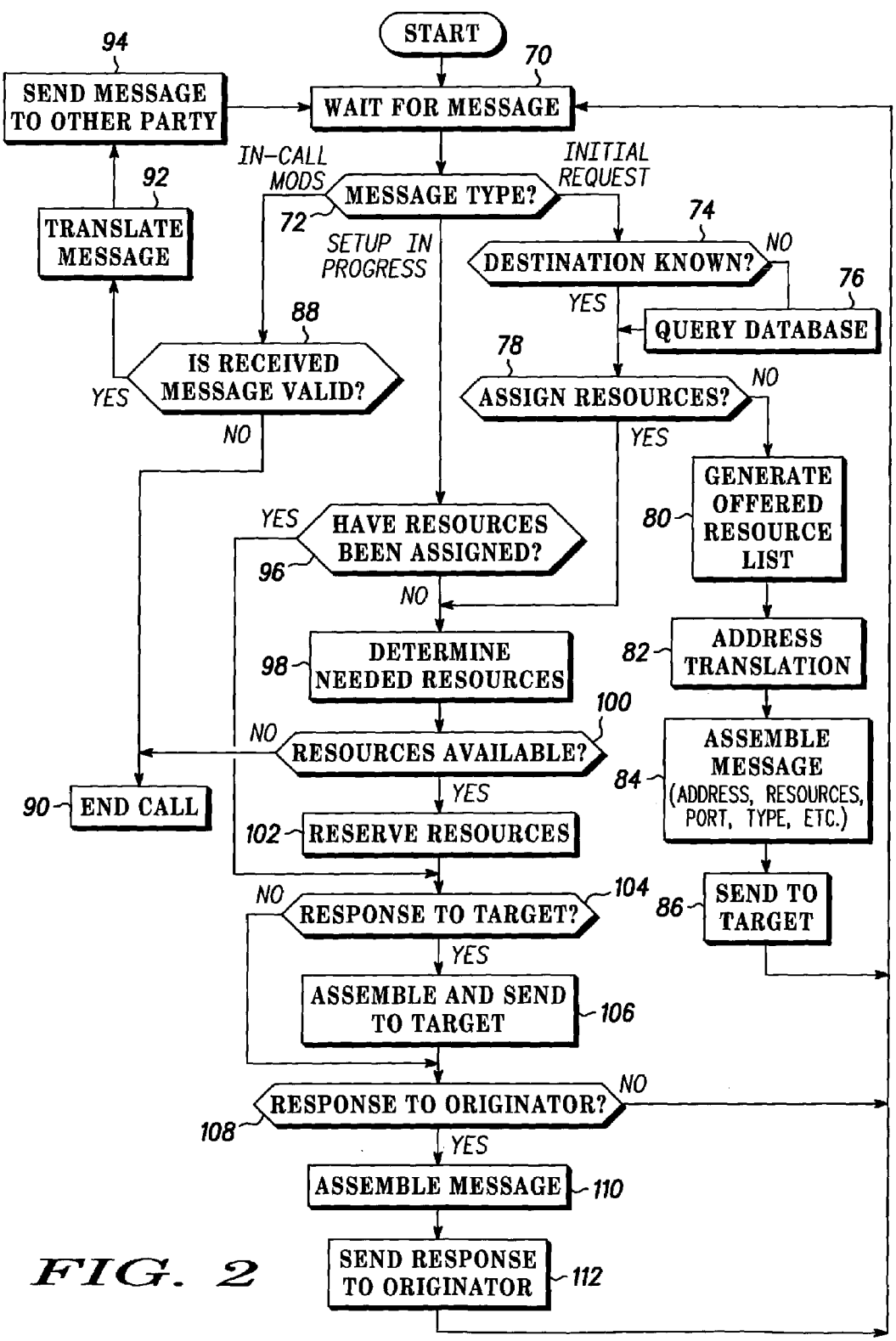
FIG. 2 is a flow chart of a method for interconnecting iDEN and non-iDEN systems in accordance with the present invention.

Referring to FIG. 2, a flow chart of the operation of the voice signaling gateway 10 is shown. The process is started and block 70 is entered. Block 70 waits for a message from one of the networks 20 or 30–60. Upon receipt of a message, block 70 transfers to block 72 which determines the message type. The message type indicates one of three conditions. The conditions are an initial request, a setup in progress or in-call modification (i.e. bearer packets).

For an initial request, block 72 transfers control to block 74. Block 74 determines whether the destination of the voice message is known. If the destination is not known block 74 transfers control to block 76 via the no path. For a request to non-iDEN networks 30–60, a database query 76 is made to a domain name server (not shown). For a request to the iDEN network 20, database query 76 interrogates the iHLR 22.

Block 76 then transfers control to block 78. If the destination of the packet was known, block 74 transfers control directly to block 78 via the yes path. Block 78 determines whether the resources may be assigned to service this dispatch call. If the resources can be assigned block 78 transfers control via the yes path to block 98. This indicates that the initial message does not specify the desired resource or resource options. For initial messages that do not specify resource options, resources cannot be assigned and block 78 transfers control to block 80 via the no path.

Block 80 generates a resource list which is offered to the source of the dispatch call. Next, DAP 17 performs an address translation, block 82. Lastly, block 84 assembles the message including the address of the dispatch call, the available resources, the port identity and type. The message is then sent back to the target network 20 or 30–60 by block 86. Block 86 then transfers control back to block 70 to wait for the next message.

If the message type as determined by block 72 is a setup in progress, block 72 transfers control to block 96. Block 96 determines whether resources have already been assigned (as defined in the initial message). If the resources have been assigned, block 96 transfers control to block 104 via the yes path. If the resources have not already been assigned, block 96 transfers control to block 98 via the no path. Also, for an initial request message type, block 78 has transferred control to block 98 via the yes path.

Block 98 determines what resources are required. Block 98 then transfers control to block 100. Block 100 determines whether the required resources are available. If not, block 100 transfers control via the no path to block 90 and the dispatch call is ended. If the resources are available, block 100 transfers control to block 102 via the yes path.

Block 102 reserves the required resources and transfers control to block 104. Earlier if the resources have already been assigned, block 96 also transfers control to block 104 via the yes path. Block 104 determines whether a response to the target of the dispatch call is required. If not, block 104 transfers control to block 108 via the no path. If a response is required, block 104 transfers control to block 106 via the yes path. Block 106 assembles a response message and sends the message to the target unit 31–62.

Block 106 then transfers control to block 108. If a response is required to the originator or source of the dispatch call, block 108 transfers control to block 110. If no response to the originator is required, block 108 transfers control to block 70 which waits for the next message. Block 110 assembles the response message. Block 112 then sends the response message to the source or originator and transfers control to block 70 to wait for the next message.

If block 72 determined that the message type was an in-call modification (such as add party, release, or bearer/voice packets), block 72 transfers control to block 88. Block 88 determines whether the received message is valid. If the received message is invalid, block 88 transfers control to block 90 via the no path. Block 90 ends the dispatch call. If the received in-call message is valid, block 88 transfers control to block 92 via the yes path. Block 92 translates the messageLastly, block 94 sends the appropriately converted message to the other party. Block 94 then transfers to block 70 to wait for the next message.

Without transcoding, a voice message is converted between iRTP by iDEN RTP 16 and RTP by standard RTP 15. With transcoding vocoders used by the end devices on 3 G and 2 G interfaces are different and the VSGW transcodes the voice appropriately and converts the voice packets between iRTP and RTP.

As can now be appreciated, a voice signaling gateway (VSGW) 10 is shown which supports interworking between iDEN and non-iDEN networks. This gateway provides the signaling and bearer path conversion of traffic between the TDMA and non-TDMA networks. Further, this gateway interfaces iDEN network to various networks such as CDMA, GSM, 802.11 or typical internet protocol networks. This invention does not require that iDEN subscribers be aware that they are communicating with a non-iDEN network. Further, the invention does not require iDEN network elements to be modified or changed.

Although the preferred embodiment of the invention has been illustrated, and that form described in detail, it will be readily apparent to those skilled in the art that various modifications may be made therein without departing from the spirit of the present invention or from the scope of the appended claims.

The invention claimed is:

1. The An arrangement for interworking a time division multiple access (TDMA) network with a plurality of non-TDMA networks, the arrangement comprising:
   voice signaling gateway (VSGW) means coupled to the plurality of non-TDMA networks and to the TDMA network, said VSGW comprising a session initiation Protocol (SIP) element and a dispatch application (DAP) element, wherein the voice signaling gateway (VSGW) means further includes:
   a VSGW signaling controller for generating signaling information for the TDMA network and the plurality of non-TDMA networks;
   a VSGW bearer traffic controller for converting bearer traffic between the TDMA network and the plurality of non-TDMA networks;
   the coupling of the VSGW means to the TDMA network including a plurality of connections for signaling and for bearer traffic; and
   the coupling of the VSGW means to the plurality of non-TDMA networks including signaling and bearer traffic connections between each of the plurality of non-TDMA networks and the VSGW means, wherein the VSGW signaling controller is coupled to the VSGW bearer traffic controller via a bearer control connection whereby the VSGW signaling controller controls bearer traffic interworking via the VSGW bearer traffic controller among the TDMA network and the plurality of non-TDMA networks.

2. An arrangement for interworking a time division multiple access (TDMA) network with a plurality of non-TDMA networks, the arrangement comprising:
   voice signaling gateway (VSGW) means coupled to the plurality of non-TDMA networks and to the TDMA network, said VSGW comprising a session initiation protocol (SIP) element and a dispatch application (DAP) element, wherein the voice signaling gateway (VSGW) means further includes:
  a VSGW signaling controller for generating signaling information for the TDMA network and the plurality of non-TDMA networks;
  a VSGW bearer traffic controller for converting bearer traffic between the TDMA network and the plurality of non-TDMA networks;
  the coupling of the VSGW means to the TDMA network including a plurality of connections for signaling and for bearer traffic;
  the coupling of the VSGW means to the plurality of non-TDMA networks including signaling and bearer traffic connections between each of the plurality of non-TDMA networks and the VSGW means; and
  a mobile application part signaling connection between the VSGW signaling controller and home location register means, the mobile application part signaling connection providing location information.

3. A method for network interworking by a voice signaling gateway (VSGW) between a time division multiple access (TDMA) network and a plurality of non-TDMA networks, the method comprising the steps of:
  determining whether a request from a source or a target is a setup request;
  determining whether resources have been assigned to the setup request;
  if the resources have not been assigned,
  determining required resources; and
  determining whether the required resources are available;
  determining whether a response to a target of a dispatch call is required; and
  sending a response message to the source or the target of the request if required.

4. The method as claimed in claim 3, wherein if the required resources are available there is further included a step of reserving the required resources by the VSGW.

5. The method as claimed in claim 3, wherein if the required resources are unavailable there is further included a step of ending a dispatch call.

6. The method as claimed in claim 3, wherein if the response to the target is required, there is further included the steps of:
  assembling the required resource into a message; and
  sending the message to the target of the dispatch call.

7. The method as claimed in claim 3, wherein if the response is not to a target, there is further included a step of determining whether the response is to an originator of the dispatch call.

8. The method as claimed in claim 7, wherein if the response is to an originator of the dispatch call there is further included the steps of:
  assembling a message including the required resources, address, port and type; and
  sending the message to the originator of the dispatch call.

9. The method as claimed in claim 8, wherein there is further included a step of waiting for a message by the VSGW.

10. The method as claimed in claim 8, wherein if the response is not to an originator of the dispatch call, there is further included a step of waiting for a message.

* * * * *